US006745340B1

United States Patent
Liu et al.

(10) Patent No.: US 6,745,340 B1
(45) Date of Patent: Jun. 1, 2004

(54) METHOD AND SYSTEM FOR RECOVERING DATA FROM AN OPTICAL WRITE ONCE READ MANY (WORM) MEDIUM WITH BOTH DIRECTORY ENTRIES DAMAGED

(75) Inventors: Zheng Henry Liu, Tucson, AZ (US); Pamela Lynn Glenn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 09/758,814

(22) Filed: Jan. 11, 2001

(51) Int. Cl.$^7$ ................................................ G06F 11/00
(52) U.S. Cl. ................................ 714/5; 714/6; 714/15; 707/202
(58) Field of Search .............................. 714/5, 15, 42, 714/6; 707/202

(56) References Cited

U.S. PATENT DOCUMENTS

| | | | | |
|---|---|---|---|---|
| 5,321,824 A | * | 6/1994 | Burke et al. | 711/220 |
| 5,457,796 A | * | 10/1995 | Thompson | 707/203 |
| 5,535,188 A | * | 7/1996 | Dang et al. | 369/53.21 |
| 5,832,526 A | * | 11/1998 | Schuyler | 707/205 |
| 6,151,685 A | * | 11/2000 | Li et al. | 714/6 |
| 6,173,291 B1 | * | 1/2001 | Jenevein | 707/200 |
| 6,453,396 B1 | * | 9/2002 | Boone et al. | 711/162 |
| 2001/0010070 A1 | * | 7/2001 | Crockett et al. | 711/162 |

FOREIGN PATENT DOCUMENTS

EP   1103895 A2 * 5/2001 ........... G06F/11/14

* cited by examiner

*Primary Examiner*—Robert Beausoliel
*Assistant Examiner*—Yolanda L Wilson
(74) *Attorney, Agent, or Firm*—Robert M. Sullivan; Bracewell & Patterson, L.L.P.

(57) ABSTRACT

A file recovery logic implemented within a data processing system is disclosed that recovers data from a file on a write once read many (WORM) medium when the file cannot be accessed due to the damage to both the hash and hierarchical directory entries. The file recovery logic controls access to the WORM medium and also access to a target medium via optical devices that enable read from the WORM medium and write to the target medium. The file recovery logic scans each logical sector of the WORM medium's data surface and identifies a location of a data header sector that corresponds to the unaccessible file. In the preferred embodiment, identification of the data header sector is completed by analyzing only the first few bytes of the sector. Upon location of the header sector, a new file is opened in a target medium and the data from contiguous sectors on the WORM medium beginning at the data header sector are retrieved and written to the new file on the target medium. The scanning, retrieving, and writing continue until a next header, a tail, or a blank sector is encountered, or the last sector on the medium's scanning range is reached. The new file is then stored on the target medium with the data from the unaccessible file, and thus, the previously unaccessible data is made available.

17 Claims, 3 Drawing Sheets

METHOD AND SYSTEM FOR RECOVERING DATA FROM AN OPTICAL WRITE ONCE READ MANY (WORM) MEDIUM WITH BOTH DIRECTORY ENTRIES DAMAGED

BACKGROUND OF THE INVENTION

1. Technical Field

The present invention relates in general to computer storage devices and, in particular, to an optical Write-Once Read-Many (WORM) medium. Still more particularly, the present invention relates to a method and program product for recovering lost data from an optical WORM medium.

2. Description of the Related Art

Sensitive data, such as a customer's banking records, legal documents, etc., are often permanently stored in a medium that permits access for later viewing of the stored data but prevents tampering and/or erasure of the data. Common examples of such a medium are the optical write-once read-many (WORM) medium and the compact disc recordable medium (CD-ROM). Present implementation of the WORM medium utilizes an optical scanner, i.e., a laser, to write and read the data, stored as files on the medium.

As the name implies, a WORM medium enables data to be written on the medium once and accessed many times thereafter. The data files are identified and access via a hash and/or hierarchical directory entry stored on the medium. Data stored on a WORM medium are considered secure because the data can not be erased from the medium or easily corrupted by an external source. The data are thus expected to be available and accessible for as long as the medium is available, and hence the WORM medium provides reliable data storage for lifetime documents.

Typically, the data in a WORM medium are accessed via one of two directory entries, a hash or a hierarchical entry. Both hash and hierarchical entries are fundamental to the data they are associated with, and both provide a backup function for each other. The hash and hierarchical entries are created at the same time the data is written on the WORM medium. Depending upon the access method utilized, one of the two entries is utilized to retrieve the data from the medium during later access.

The protection provided by the WORM medium, however, does not always prevent files from becoming damaged. Many factors such as power failure, device problems, software problems, user's improper operation of the device, etc., may cause damage to the stored data. Also, failure of the WORM medium may occur for a number of reasons, including calibration track damage, electric static discharge damage, or contaminants embedded on the medium. When damage to the files on the medium occurs, some of the data stored in the medium will no longer be accessible by users with the normal data retrieval procedures that utilize a data retrieval application.

In some instances, the damage may be permanent, (e.g., physical damage to the media, raw data area (sectors) damage, etc.) and the data will never be recovered. However, most of the time data retrieval problems encountered with a WORM medium is caused by damage to a directory entry, which prevents the associated data from being accessible by referencing that directory entry. Directory entry damage may be attributed to the fact that, with most file system design, the directory entry sector on the medium is scanned very often compared to the area on which the data is stored, leading to excessive wear and eventual damage. Thus, having a damaged data area is not uncommon for a file stored on a WORM medium.

Because the directory entries are initially stored in pairs, fixing a damaged directory entry of a file on a WORM medium is usually not a difficult task when the backup directory entry is available. Repairing a bad directory entry for a file using the good backup entry has become a standardized procedure.

In certain instances, however, both the hash and hierarchical file entries of a file are damaged or destroyed, and the user can no longer retrieve the file from the WORM medium although the file's data are saved permanently on the WORM medium. Presently, there is no generally applicable way to recover a file if both directory entries are damaged. The situation may be especially critical for a file owner when there is no other source of the data except that on the WORM medium.

SUMMARY OF THE INVENTION

A file recovery logic implemented within a data processing system is disclosed that recovers data from a file on a write once read many (WORM) medium when the file cannot be accessed due to the damage to both the hash and hierarchical directory entries. The file recovery logic controls access to the WORM medium and also access to a target medium via optical devices that enable read from the WORM medium and write to the target medium. The file recovery logic scans each logical sector of the WORM medium's data surface and identifies a location of a data header sector that corresponds to the unaccessible file. In the preferred embodiment, identification of the data header sector is completed by analyzing only the first few bytes of the sector. Upon location of the header sector, a new file is opened in a target medium and the data from contiguous sectors on the WORM medium beginning at the data header sector are retrieved and written to the new file on the target medium. The scanning, retrieving, and writing continue until a next header, a tail, or a blank sector is encountered, or the last sector on the medium's scanning range is reached. The new file is then stored on the target medium with the data from the unaccessible file, and thus, the previously unaccessible data is made available.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
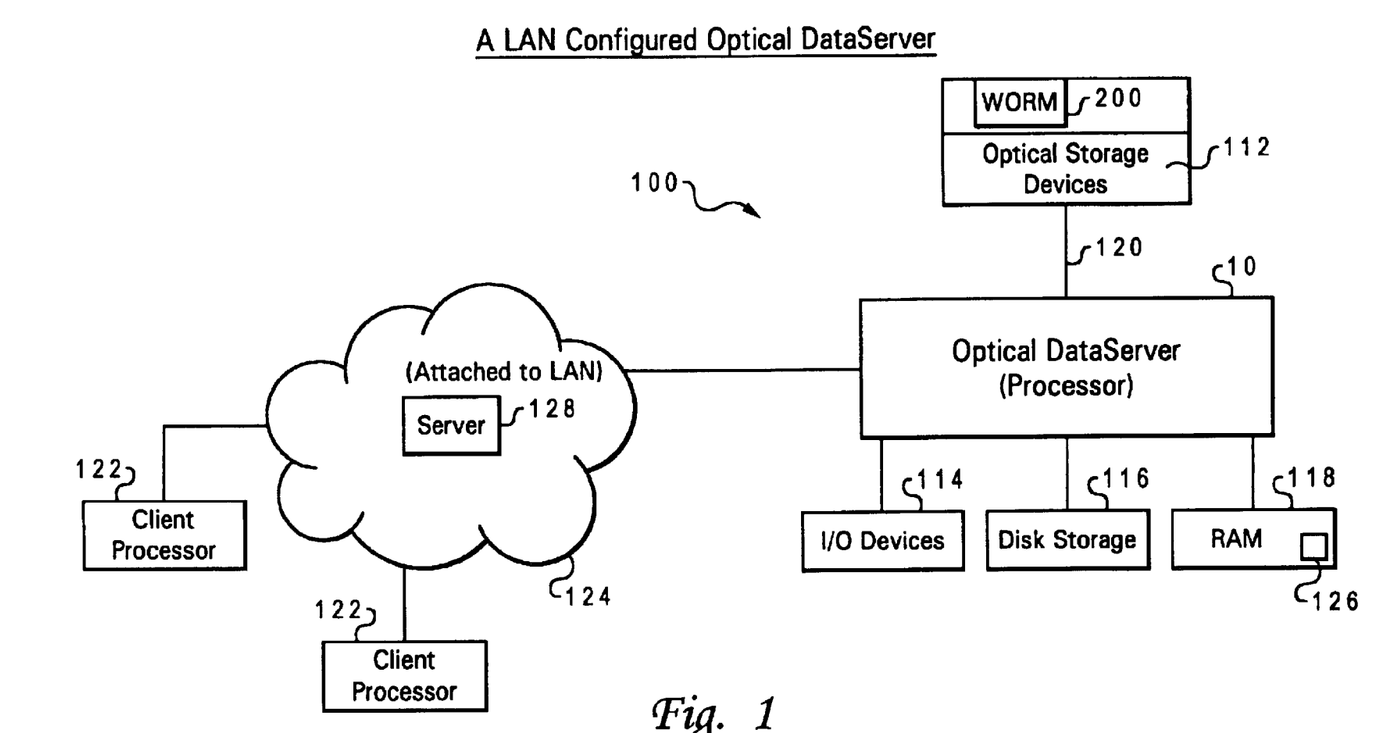
FIG. 1 depicts an illustrative embodiment of a data processing system with which the method of the present invention may advantageously be implemented.

With reference now to the figures and in particular with reference to FIG. 1, there is illustrated a block diagram of a data processing system, with which the preferred embodiment of the invention may advantageously be implemented. Data processing system 100 has at least one processor 10 which is connected to several peripheral devices, including input/output devices 114 (such as a display monitor, keyboard, and graphical pointing device) for user interface, a disk storage 116 (such as a hard disk) for storing the data processing system's operating system and applications, and a temporary memory device 118 (such as random access memory or RAM) that is utilized by processor 10 in execution of current program instructions. Additionally, processor 10 is connected to a data storage device 112, the optical device drive(s), which includes write once read many (WORM) medium 200. (And some other type of optical medium, such as re-writable optical medium, Referred as MO medium). Processor 10 communicates with the peripheral devices by various means. In particular processor 10 communicates with data storage device 112 via a small computer system interface (SCSI) bus 120.

The data processing system may be configured as a stand-alone system, and data storage device provides local data storage (i.e., extension of disk storage 116). In the preferred embodiment, the data processing system 100 is configured as a network Data-Server. Thus, data processing system 100 may operate primarily as a major data storage device for network clients 122 connected across a network 124, and controlled by a network server (domain controller) 128. In the preferred embodiment, network 124 is a local area network (LAN). Users utilize the data storage across LAN through different ways depending upon the system configuration, such as token-ring, Ethernet, channel, etc.

Those skilled in the art will further appreciate that there are other components that might be utilized in conjunction with those shown in the block diagram of FIG. 1; however because of the unique purpose of data storage device 112, the data-server 10 is usually not connected to many other components in order to ensure the reliability of data storage and the integrity of the data. When data processing system 100 is powered-up, data may be written to a optical storage device 112 and read from optical storage device 112. However, typically, data may be frequently retrieved from WORM medium 200 as soon as the data are stored on the medium.

In the preferred embodiment, data processing system hosts file recovery logic 126 that controls the various functionality of the present invention. File recovery logic 126 is executed within processor 10 and recovers data from a file on (WORM) medium 200 when the file cannot be accessed due to the damage to both the hash and hierarchical directory entries.

The file recovery logic is initiated by an administrator when both the hash and hierarchy entries of a file are bad, i.e., the file cannot be accessed. The file recovery logic is created based upon the realization that WORM medium 200 whenever the data logical block address (LBA) range (i.e., a 32-binary digit value that maps to a specific cylinder-track-sector address on the storage medium) is not mapping to any hash/hierarchy structure, that the file cannot be accessed. The file recovery logic implements the physical examination of these LBAs to determine the data ranges. Specifically, by examining the data LBA, the file recovery logic determines if the data has a header identifier or not. When the data has a header identifier, the corresponding sector is selected as the start point to scan the cartridge's LBA one-by-one contiguously until another header identifier, a tail identifier, a blank, or a VMI/SMI/DSS, etc., sector is encountered. In the preferred embodiment, certain data sectors are excluded from the analysis including, for example, Static Media Information sectors (SMI), Variable Media Information sectors (VMI), and Directory Storage Segment sectors (DSS), and data related to these sectors are not analyzed.

Figure 2A:
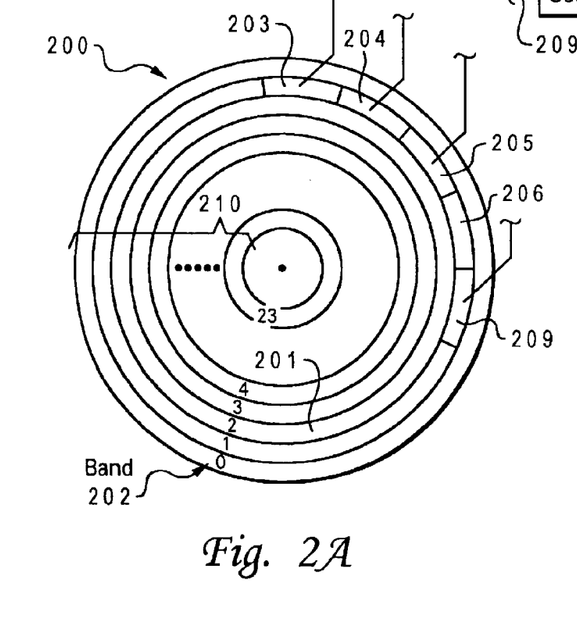
FIGS. 2A and 2B depict a WORM medium (or storage device) and sectorized information on the WORM medium according to one embodiment of the present invention.

Referring now to FIG. 2A, there is illustrated a data surface of an 8X WORM medium 200, which may be accessed by the data recovery processes implemented by file recovery logic 126 of FIG. 1, according to a preferred embodiment of the present invention. WORM medium 200 includes a number of concentric data cylinders such as cylinder 201.

WORM medium 200 comprises a write surface 210, which is a planar surface delineated with band 202. As illustrated, WORM medium 200 comprises 24 bands, numbered 0–23. Each band 202 contains a number of tracks, and in turn, each track contains a number of sectors. Exemplary track 1 201 includes several sectors, such as sectors 203–206, 209, which includes data sectors 203–206 of a file. As illustrated data sectors 203–206 are contiguous.

The number of sectors in a track varies depending on the location of the track on WORM medium 200, even though logically the number is fixed at seven for 8X WORM medium 200. The sector is considered the smallest unit on WORM medium 200 that can be allocated/identified by a read/write application. Each sector may store 512, 1024, or 2048 bytes of data depending on the type of manufacture and medium type. The data stored on WORM medium 200 is identified by the sector's physical block address (PBA) at its sector header area. However, the sector's logical block address (LBA), which is automatically mapped to a PBA by the WORM medium's map table is utilized by upper level optical storage I/O applications.

During the data recovery process of the invention, the optical reader (writer) associated with the optical storage devices 112 of FIG. 1 is controlled by file recovery logic, which targets the specific sectors to read and monitors the information read from a sector for header information.

Figure 2B:
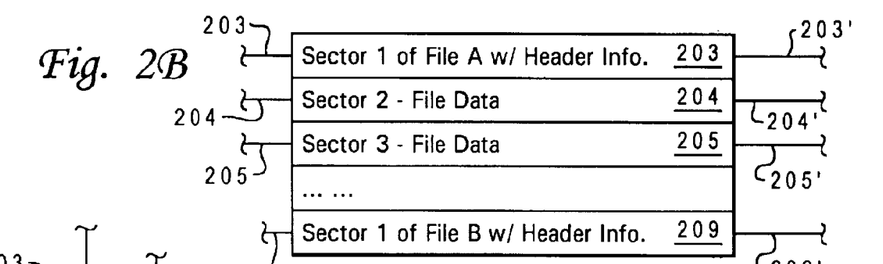

FIG. 2B illustrates a tabulated representation of sectors 203–206, 209 of WORM medium 200 of FIG. 2A. Other sectors may be included on WORM media 200 with information associated with others features of the file, such as the file's extent. Additionally, each file begins with a header sector 203 that includes header identifying information in the first a few bytes.

For the image application utilized by most users of WORM media, the file recovery logic is able to identify the header identifier by looking at the first 6 bytes of that LBA, which is identified as "00** D3A8 A800". Thus, in the preferred embodiment, although all other LBA information at the range, i.e., VMI, SMI, DSS blank-sector, etc., is reported back (e.g., the DSS's header identifier is "4454 532D 5345 4720"), only the first six (6) bytes of information is required to test for the header. For general application of the features of the invention, the actual number of bytes required to determine whether a sector is header sector 203 may vary depending on the file's type and/or the medium.

Figure 2C:
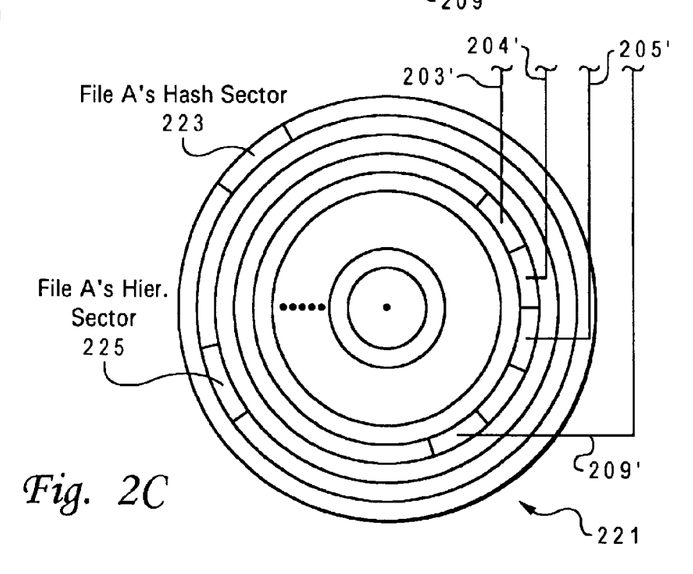
FIG. 2C illustrates a target medium that receives data from the WORM medium during a preferred implementation of the present invention.

FIG. 2C illustrates a sample target medium 221, which may be one of optical storage devices 112, disk storage 116, or RAM 118 of FIG. 1. Preferably, target medium is one of optical storage devices 112. As illustrated by FIGS. 2A–2C, the present invention provides a method associated with a file recovery logic by which file data (found in data sectors 203–206) are retrieved from WORM medium 200 on which both the hash and hierarchical directory entries of the file are damaged, or other storage medium (i.e., any source medium) on which no any directory information is associated with the data, and written to target medium 221. Once written to target medium 221 (illustrated as a next WORM medium in FIG. 2, for instance, and similarly for other type of medium), the file data is provided with a hash entry 223 and hierarchical entry 225, which allows user access to the file.

Generally, if a data's header and/or tail can be detected for an unaccessible file stored on a first storage medium (the source medium), a new file is opened on a different medium (the target medium 221), and the data may be retrieved from the source medium and written to the target medium 221. The invention finds applicability with most image files, for example, scanned legal documents of a court or scanned checks of a bank. The invention provides a new file 233 that has exactly the same information or raw data as the originally written file, with perhaps the exception of the file name. With the invention, a user is thus able to recover a lost file, particularly when the user does not have a backup copy of the file.

In the preferred embodiment, certain conditions are desired to permit accurate and efficient retrieval of a lost file. Primarily, the data sectors are assumed to be undamaged (even though they are no longer viewable by users or accessible by a data retrieval application) and written contiguously on the storage medium. Secondly, the file should have a clearly identifiable data header that allows the file recovery logic to identify the lost data piece (counted in number of sectors) and map the lost data piece to a newly created file on the target. These condition are generally applicable to current optical WORM media, which are written to by applications that utilized specific header identifier when writing the data. Also the file systems that create the file directory information writes the data contiguously on the WORM medium 200. With the above conditions present, the file recovery logic may successfully recover unaccessible files with both directory entries damaged following the process of FIG. 3 below.

Figure 3:
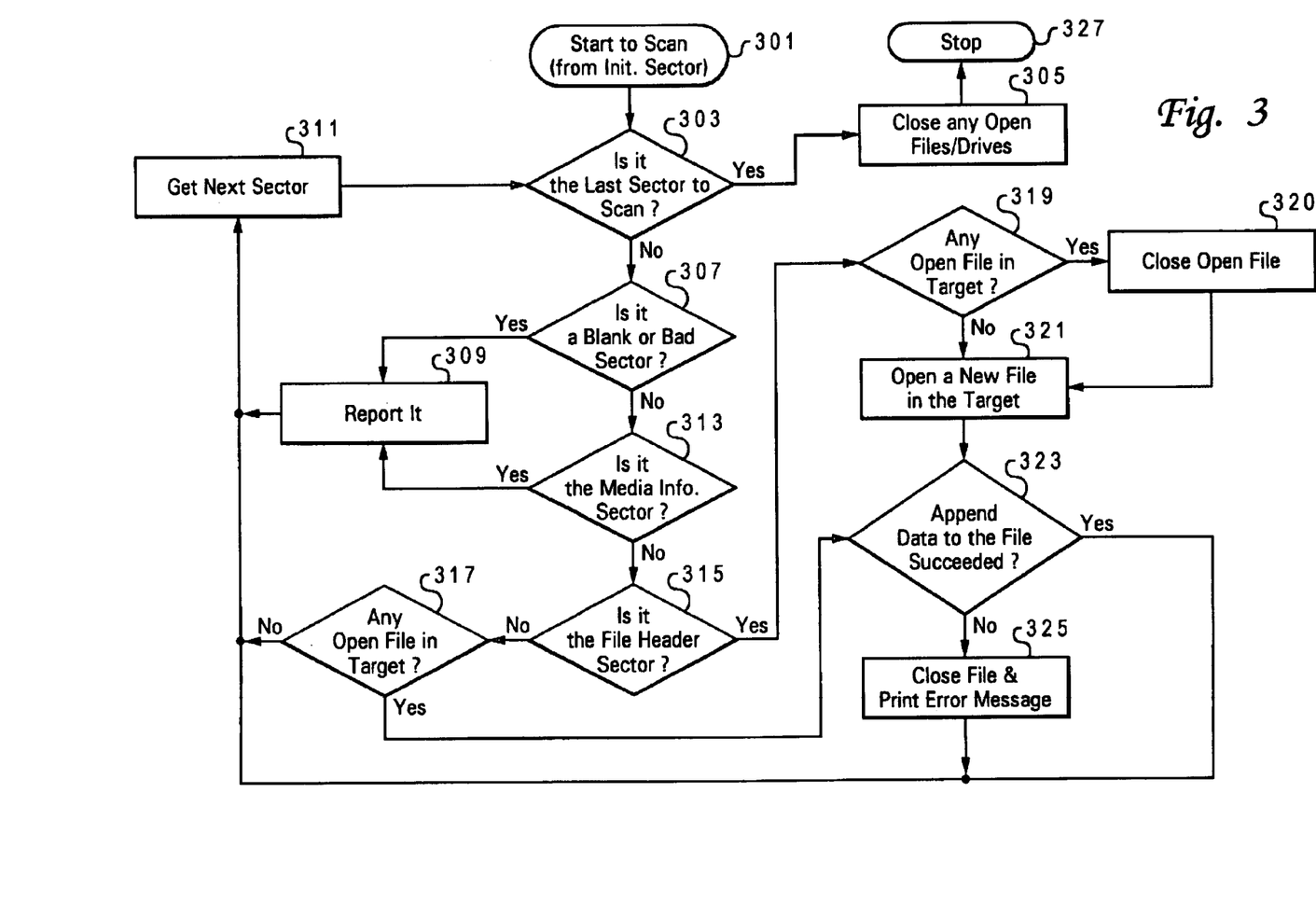
FIG. 3 illustrates a high level flow chart of the file recovery process in accordance with one preferred embodiment of the present invention.

FIG. 3 illustrates a flow chart of the process by which recovery of and transfer of data from files with corrupted directory entries on WORM medium 200 to target medium 221 is completed. The process begins at block 301 when the file recovery logic begins scanning the source medium 200 for the first sector on which file information is located. The scanning mechanism is able to detect the lost file's data area by scanning and analyzing the source medium 200 and finding the data area without mapping to any existing directory entries. The operator is assumed to know the LBA range of "lost" files on the medium so that the header information may be identified from the starting sector (the LBA range is pre-determined by scanning the source medium 200 and analyzing the data from the scanned return). A determination is made at block 303 whether the sector being scanned is the last sector in the range or the last logical sector on the source medium 200. If the sector is neither the last sector in the range or the last logical sector on the source medium 200, a next determination is made at block 307 whether the sector is either a bad sector or a blank sector. If the sector is bad or blank, the sector's LBA is reported at block 309. Following, the next sector is scanned at block 311.

If however, the sector was not bad or blank, then a next determination is made at block 313 whether the sector is a medium or directory information sector, e.g., SMI, VMI, and DSS, etc. If the sector is the medium/directory information sector, the sector is reported at block 309. If, however, the sector is not the medium/directory information sector, then a next determination is made at block 315 whether the sector is a file's beginning sector. If the sector is a file's beginning sector then a check is made at block 319 whether there is any open file in the target medium 221. An open file in the target medium 221 may suggest that a previous restore operation is still in process and hence needs to be completed. If there is an open file in the target medium 221 when a file's beginning sector is encountered, the open file is closed at block 320. Following, a new file is opened in the target medium 221 at block 321. A new file is also opened when there are no open files in the target medium 221. Then a determination is made at block 323 whether a attempt to append the data to the newly opened file in the target succeeded. When attempts to append data fails, the file is closed and an error message is outputted to the user at block 325. The error message may be displayed on screen or printed to a log file depending on the particular implementation of the invention. However, when the data are appended to the new file successfully, the process returns to block 311 where a next sector is read from the source medium to continue the process.

Returning to decision block 315, if the sector is not a file's beginning sector (e.g., it is a regular data sector), then a next determination is made at block 317, whether there is an open file in the target medium 221. If there is an open file, then the data are forwarded to the target medium 221, and the process proceeds to block 323. Otherwise the process proceeds to block 311.

Returning now to block 303, if the sector is the last sector of the scanning range or last logical sector, then all open files on source medium 200 and target medium 221 are closed at block 305, and the process terminates at block 327.

Accordingly, the process reiterates until the final sector is located and scanned. Also, an error may occur when attempting to transfer data to the new file causing the retrieval attempt to fail. However, when the above listed assumptions and/or conditions are correct, then the entire file may be efficiently recovered.

The present invention does not create an original file directory entry with the data because no directory information exists. The data that is recovered is assigned a new file name which may be numerically-based, and new directory entries are provided. Following the recovery, the new file may be reviewed by the relevant personnel to determine the original file directory to which the recovered data relates. Then, the recovered data may be stored with a selected file name accordingly.

The preferred implementation has been described with specific reference to optical medium recovery; however, the invention is further applicable to any other media that meets the above listed conditions. For example, the data recovery process can be applied to optical Re-writeable MO medium with moderate conditions. Also the data recovery process can be easily modified to other types of medium with comparable conditions.

For other types of applications, the invention allows the recovery of the data if the header identifier is provided or the header identifier can be ascertained by physically checking the file's LBAs. The invention recognizes that if the data itself is damaged, there is significant burden to recover the data simply the same logic, although portions of the data may be retrieved in this manner. However, other more complex data recovery mechanisms may be utilized to deal with partial recovery if there is a damage in the data area, once the header identifier can be located.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of recovering data from a storage medium when both directory entries are damaged or missing, said method comprising:
    detecting a header sector of said data on said storage medium;
    mapping a range of contiguous sectors from said header sector to a last contiguous sector containing a portion of said data;
    opening a target file on a target medium;
    copying said contiguous sectors containing said data from said storage medium to said target file; and
    saving said target file with new directory entries on said target medium identifying said target file.

2. The method of claim 1, further comprising:
    analyzing said data for identifying information; and
    generating said new directory entries utilizing said identifying information.

3. The method of claim 1, wherein said detecting step includes examining a pre-selected number of bytes of a sector of said storage medium to determine when said sector is a header sector.

4. The method of claim 3, wherein said storage medium is an optical write once read many medium, said method further comprising:
    examining a first six bytes of a logical block address of said sector; and
    comparing said first six bytes with a known grouping of bytes associated with header sectors of data, stored on said storage medium.

5. The method of claim 1, wherein said detecting step further comprises:
    progressively scanning a surface of said storage medium for said header sector responsive to a user initiated search for said data whenever said data does not have a working directory entry.

6. The method of claim 1, wherein said mapping and copying steps further comprise:
    retrieving data from said storage medium to write to the target medium until an end of associated data condition occurs from among: reaching a last sector on said storage medium;
encountering a blank sector breaking a continuity of said sectors, detecting an end of file marker, and detecting a next header belonging to another data file.

7. A data recovery mechanism comprising:
    a scanning component that reads information stored on a first storage medium;
    data retrieval logic that controls said scanning component to:
        detect a header sector associated with data, that has both hash and hierarchical directory entries corrupted/damaged;
        read said data contiguously following said header sector until a last contiguous sector containing said data is read;
        open a new file on a second storage medium;
        write said data to said new file; and
        associating new directory entries with said data on said second storage medium.

8. The data recovery mechanism of claim 7, wherein said first storage medium is an optical write once read many medium, and said data retrieval logic detects said header by examining a first six bytes of a logical block address and comparing said first six bytes with a known group of bytes that are associated with header sectors on said first storage medium.

9. The method of claim 7, wherein said data retrieval logic comprises logic for:
    retrieving data from said storage medium to write to the target medium until an end of associated data condition occurs from among: reaching a last sector on said storage medium; encountering a blank sector breaking a continuity of said sectors, detecting an end of file marker, and detecting a next header belonging to another data file.

10. A computer program product comprising:
    a computer readable medium; and
    program instructions on said computer readable medium for recovering data from a storage medium on which both hash and hierarchical directories are damaged, said instructions comprising instructions for:
        detecting a header sector of said data on said storage medium;
        mapping a range of contiguous sectors from said header sector to a last contiguous sector containing said data;
        opening a target file on a target medium;
        copying said contiguous sectors within said range from said storage medium to said target file; and
        assigning new directory entries to said data in the target file, including a hash entry and a hierarchical entry, to enable user access to said data.

11. The computer program product of claim 10, wherein said detecting program instruction includes program instruction for examining a pre-selected number of bytes of a sector of said storage medium to determine when said sector is a header sector.

12. The computer program product of claim 10, wherein said storage medium is an optical write once read many medium, and further wherein said detecting program instruction examines a first six bytes of a logical block address of said sector and compares said first six bytes to a known group of bytes that are associated with header sectors on said storage medium.

13. The computer program product of claim 10, further comprising program instruction for progressively scanning a surface of said storage medium for said header sector responsive to a user initiated search for said data when said data does not have a working directory entry.

14. The computer program product of claim 10, wherein said program instructions for said mapping and copying steps further comprise program instructions for:
retrieving data from said storage medium to write to the target medium until an end of associated data condition occurs from among: reaching a last sector on said storage medium;
encountering a blank sector breaking a continuity of said sectors, detecting an end of file marker, and detecting a next header belonging to another data file.

15. A data processing system comprising:
a first storage medium containing data for which both a hash and a hierarchical directory entry are damaged;
a scanning mechanism that reads information stored on a first storage medium;
a write mechanism associated with a second storage medium; and
data retrieval logic that controls said scanning mechanism to:
detect a header sector associated with data that has both said hash and hierarchical directory entries damaged;
read data contiguously following said header sector until a last sector of said data is read;
open a new file on a second storage medium;
write said data to said new file utilizing said write mechanism; and
associating said data within said new file on said second storage medium with new directory entries, including a hash entry and a hierarchical entry, to enable user access to said data.

16. The data processing system of claim 15, wherein said first storage medium is an optical write once read many medium, and said data retrieval logic detects said header by examining a first six bytes of a logical block address and comparing said first six bytes to a known group of bytes that are associated with header sectors on said first storage medium.

17. The method of claim 15, wherein said data retrieval logic comprises logic for:
retrieving data from said storage medium to write to the target medium until an end of associated data condition occurs from among: reaching a last sector on said storage medium;
encountering a blank sector breaking a continuity of said sectors, detecting an end of file marker, and detecting a next header belonging to another data file.

* * * * *

UNITED STATES PATENT AND TRADEMARK OFFICE
CERTIFICATE OF CORRECTION

PATENT NO.        : 6,745,340 B1
APPLICATION NO.   : 09/758814
DATED             : June 1, 2004
INVENTOR(S)       : Liu et al.

It is certified that error appears in the above-identified patent and that said Letters Patent is hereby corrected as shown below:

In Claim 1, at column 7, line 28, after "both" and insert --hash and hierarchical--.

In Claim 4, at column 7, line 54, after "data" and before "stored" delete the comma ",".

In Claim 6, at column 7, line 63, after "comprise" and before the colon ":" insert --program instructions for--.

In Claim 6, at column 8, line 4, after "sectors" and before "detecting" delete the comma "," and insert --; (semi-colon)--.

In Claim 6, at column 8, line 4, after "marker" and before "and" delete the comma "," and insert --; (semi-colon)--.

In Claim 9, at column 8, line 28, delete "method" and insert --data recovery mechanism--.

In Claim 9, at column 8, line 34, after "sectors" and before "detecting" delete the comma "," and insert --; (semi-colon)--.

In Claim 9, at column 8, line 35, after "marker and before "and" delete the comma "," and insert --; (semi-colon)--.

In Claim 17, at column 10, line 15, delete "15" and insert --16--.

In Claim 17, at column 10, line 15, delete "method" and insert --data processing system--.

In Claim 17, at column 10, line 22, after "sectors" and before "detecting" delete the comma "," and insert --; (semi-colon)--.

UNITED STATES PATENT AND TRADEMARK OFFICE
CERTIFICATE OF CORRECTION

PATENT NO. : 6,745,340 B1
APPLICATION NO. : 09/758814
DATED : June 1, 2004
INVENTOR(S) : Liu et al.

It is certified that error appears in the above-identified patent and that said Letters Patent is hereby corrected as shown below:

In Claim 17, at column 10, line 22, after "marker" and before "and" delete the comma "," and insert --; (semi-colon)--.

Signed and Sealed this

Fifth Day of September, 2006

JON W. DUDAS
*Director of the United States Patent and Trademark Office*